United States Patent
Svensson et al.

(10) Patent No.: US 7,281,602 B2
(45) Date of Patent: Oct. 16, 2007

(54) METHOD AND DEVICE FOR CONTROLLING SPECIFIC FUNCTIONS WITHIN A LOAD-CARRYING VEHICLE UNDER DUMPING AND/OR LOADING THE LOAD-CARRYING PLATFORM OF THE VEHICLE

(75) Inventors: Gösta Svensson, Växjö (SE); Jonas Karlsson, Alvesta (SE); Goran Karlstrom, Vaxjo (SE)

(73) Assignee: Volvo Construction Equipment AB, Brass (SE)

( * ) Notice: Subject to any disclaimer, the term of this patent is extended or adjusted under 35 U.S.C. 154(b) by 723 days.

(21) Appl. No.: 10/065,972

(22) Filed: Dec. 5, 2002

(65) Prior Publication Data

US 2003/0111891 A1   Jun. 19, 2003

Related U.S. Application Data

(63) Continuation of application No. PCT/SE01/01231, filed on Jun. 1, 2001, now abandoned.

(30) Foreign Application Priority Data

Jun. 5, 2000   (SE) .................................... 0002087

(51) Int. Cl.
*B60K 26/00* (2006.01)

(52) U.S. Cl. ..................................... 180/333

(58) Field of Classification Search ................ 180/333, 180/336; 192/218, 220.1, 219.4; 298/19 R, 298/22 C; 303/13; 188/105
See application file for complete search history.

(56) References Cited

U.S. PATENT DOCUMENTS

| | | | | |
|---|---|---|---|---|
| 3,858,696 A | * | 1/1975 | Shore | 192/221 |
| 3,939,937 A | * | 2/1976 | Moberg | 180/336 |
| 4,088,208 A | * | 5/1978 | Goode | 192/220.1 |
| 4,560,148 A | * | 12/1985 | Palmer | 303/13 |

FOREIGN PATENT DOCUMENTS

| | | | |
|---|---|---|---|
| JP | 58-214424 A | | 12/1983 |
| JP | 61046723 A | * | 3/1986 |
| JP | 62-258829 A | | 11/1987 |

* cited by examiner

*Primary Examiner*—Faye M. Fleming
(74) *Attorney, Agent, or Firm*—Novak Druce + Quigg, LLP

(57) ABSTRACT

Method and device for controlling specific functions of a load-carrying vehicle when dumping and/or loading the load-carrying platform of the vehicle. The device includes a maneuvering organ (control input) that is arranged in the cabin of the load-carrying vehicle for hand maneuvering by the driver. The maneuvering organ (control input) is coupled to at least one of the brakes of the load-carrying vehicle and to the gearbox of the load-carrying vehicle so that it when activated may activate the brake and select a neutral position in the gearbox.

21 Claims, 2 Drawing Sheets

METHOD AND DEVICE FOR CONTROLLING SPECIFIC FUNCTIONS WITHIN A LOAD-CARRYING VEHICLE UNDER DUMPING AND/OR LOADING THE LOAD-CARRYING PLATFORM OF THE VEHICLE

CROSS REFERENCE TO RELATED APPLICATIONS

This application is a continuation of International Application No PCT/SE01/01231 filed 1 Jun. 2001, now abandoned with respect to the United States, which claims priority to Swedish Application No. 0002087-5, filed 5 Jun. 2000. Both applications are expressly incorporated herein by reference in their entireties.

BACKGROUND OF INVENTION

1. Technical Field of the Invention

The present invention relates to a device for controlling specific functions of a load-carrying vehicle when dumping and/or loading the load-carrying platform of the vehicle. The load-carrying vehicle is preferably a construction machine. In the following, the invention will be described in the context of a waist controlled dumper (articulated hauler). This is to be seen as a preferred but in no way limiting application of the invention. The invention can, for example, also be used in a truck. The invention also relates to a method for performing the control functions.

2. Background Art

When dumping the load-carrying platform of a waist controlled dumper, also known as a basket, according to previous technology a number of operations are necessary on the part of the driver of the vehicle. These operations will be described below.

The vehicle is backed up against an intended dumping position, and the platform is tilted, allowing the driver to see the ground below and behind the platform. The position of the platform is controlled by means of a tilting lever arranged in the cabin. The tilting lever is usually arranged to the right of the driver, for maneuvering with his right hand. When the vehicle has reached the intended dumping position, the gas pedal is released, and instead the brake pedal is activated. Using the left hand, a gear lever coupled to the gearbox is brought to the neutral position. During the dumping, the brakes are either activated by means of the brake pedal, or the parking brake of the vehicle is utilized. Following the dumping and the return of the platform to the initial position, a gear is engaged, the activated brake is released and the vehicle is driven away.

Loading of a waist controlled dumper according to previous technology can, for example, be done in the following manner.

The dumper is backed up against an intended loading position, and is braked. The brake is then kept activated, and/or the parking brake is activated, and the gearbox is brought to the neutral position. When the platform has been loaded, a gear is engaged and the vehicle is driven away.

In many cases, especially when loading the dumper from behind, the brakes are subjected to large forces. The parking brake is usually too weak to withstand these forces, leading to the driver instead utilizing the brakes of the vehicle. Especially when loading for long periods, this is tiresome for the driver since he must keep the brake pedal pressed down.

Due to the large tractive forces obtained at least in larger models of waist controlled dumpers, there is a risk that, when utilizing the parking brake, the driver, especially after loading, will forget to release the parking brake. This will lead to wear, and in some cases to a breakdown of the parking brake.

SUMMARY OF INVENTION

A purpose of the invention is to obtain a device that simplifies and facilitates the maneuvering of a load-carrying vehicle when dumping and/or loading. In addition, a device is achieved which contributes to improved safety during such maneuvers relative to previously known technology. Additionally, a device is desired which secures the parking brake function of the vehicle with reduced risk of unnecessary wear.

These purposes are obtained by a device that includes a maneuvering organ (control input) that is arranged in the cabin of the load-carrying vehicle for hand maneuvering by the driver, and by the maneuvering organ (control input) being coupled to at least one of the brakes of the load-carrying vehicle, and to the gearbox of the load-carrying vehicle, so that when activated, it may activate the brake and obtain a neutral position of the gearbox. In so doing, two functions are obtained by means of only one hand operation, which considerably simplifies the maneuvering of the vehicle. In addition, the driver does not need to keep the brake pedal pressed down during loading, which is a simplification, especially when loading during longer periods of time.

According to a preferred embodiment of the invention, the maneuvering organ (control input) is arranged in such a way that it is within reach of the driver while the driver at the same time is maneuvering the steering wheel and the tilting lever. This means that the driver can bring about the neutral position of the gearbox without moving his hands from the steering wheel or the tilting lever respectively, which leads to improved safety.

According to another preferred embodiment of the invention, the maneuvering organ (control input) is arranged on a panel in the cabin, in the immediate vicinity of a tilting lever in such a way that it can be reached by the driver while simultaneously maneuvering the tilting lever with the same hand. This means that the driver can bring the gearbox to the neutral position by maneuvering the maneuvering organ (control input) with the same hand, preferably the right hand, that he is using to maneuver the tilting lever with. Thus, the driver does not need to use his left hand to maneuver the gear lever, but has his left hand free to control the steering wheel of the vehicle.

The device suitably includes a control unit to which the maneuvering organ (control input), the gearbox and the brakes are coupled, for controlling the activation of the brakes and bringing the gearbox to the neutral position when activating the maneuvering organ (control input) respectively. The control unit is also arranged to release the brakes, and to permit selection of a gear in the gearbox with a gear lever when deactivating the maneuvering organ (control input).

According to another preferred embodiment of the invention, the device comprises an organ (control input) connected to the control unit for detecting a manual movement of a gear lever connected to the gearbox. This means that the brakes can be released only after the gearbox has been brought to a gear position separate from the neutral position, which means that the transmission is in a tractive position. This reduces the risk that the vehicle will start to move before the tractive position is reached, which is risky especially when the vehicle is on a slope.

According to another preferred embodiment of the invention, the device includes an organ or input connected to the control unit for detecting the speed of the vehicle with the purpose of maintaining the brakes in a non-active position and the current gear of the gearbox in spite of an activation of the maneuvering organ (control input) when the speed of the vehicle exceeds a predetermined speed. This eliminates the risk that the brakes will be activated when the maneuvering organ (control input) has been maneuvered by mistake during motion of the vehicle.

According to another preferred embodiment of the invention, the device comprises an organ (element) coupled to the control unit for detecting the pressure in the brakes, and the control unit is coupled to the parking brake of the vehicle for activation of it when the brake pressure falls below a certain value. This reduces the risk of an undesired movement of the vehicle during dumping/loading with a faulty brake.

An additional purpose of the invention is to enable a method that simplifies and facilitates the maneuvering of a load-carrying vehicle when dumping and/or loading. In addition, a method is desired which contributes to improved safety during the maneuvering relative to previously known technology. Additionally, a method is desired which secures the parking brake function of the vehicle with a reduced risk of unnecessary wear.

These purposes are obtained by means of a method for controlling specific functions of a load-carrying vehicle when dumping and/or loading the load-carrying platform of the vehicle, with the detection of maneuvering of a hand maneuvering organ arranged in the cabin of the load-carrying vehicle and by at least one of the brakes of the load-carrying vehicle being activated and the gearbox of the load-carrying vehicle being brought to assume a neutral position when activating the hand maneuvering organ (control input).

Other preferred embodiments and advantages of the invention will become apparent from the dependent claims and the following description.

BRIEF DESCRIPTION OF DRAWINGS

The invention will in the following be described in more detail with reference to the embodiments shown in the appended drawings.

DETAILED DESCRIPTION

Figure 1:
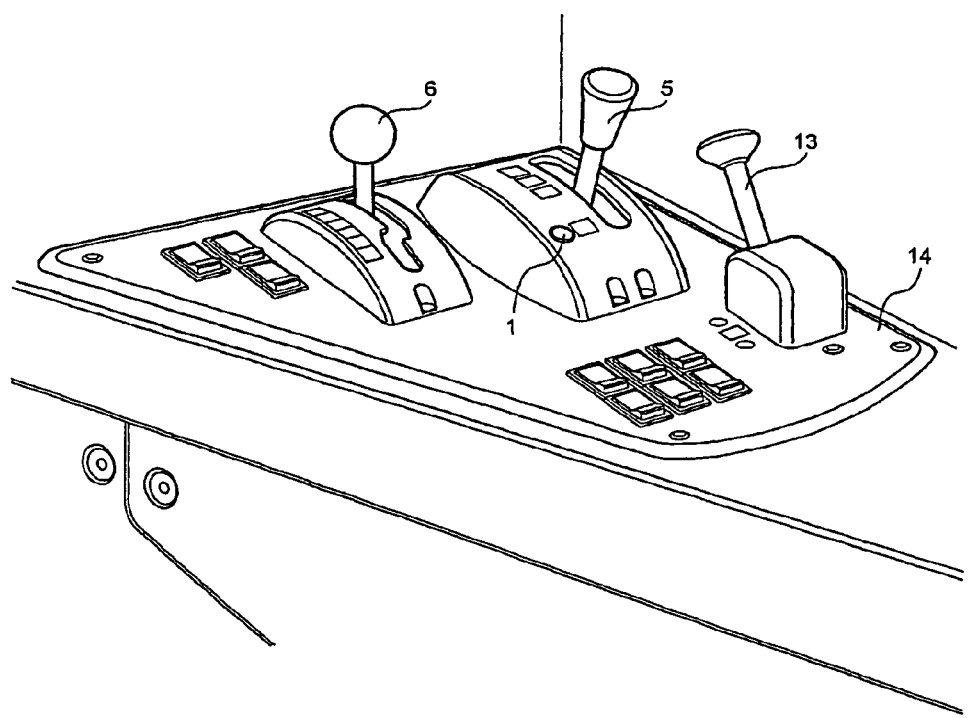
FIG. 1 shows an instrument panel in the cabin of the vehicle.
Figure 2:
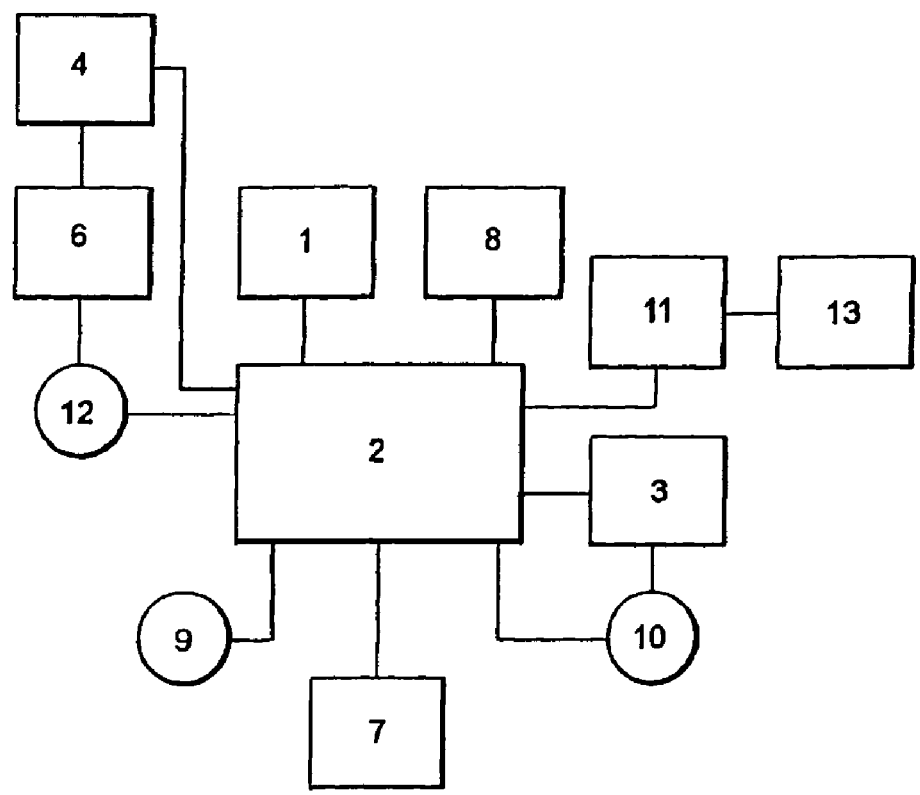
FIG. 2 schematically illustrates the coupling between the components of the invention in a preferred embodiment.

In the following, the invention will be explained with the aid of FIGS. 1 and 2. The invention relates to a device for controlling specific functions of a load-carrying vehicle when dumping and/or loading the load-carrying platform of the vehicle. The device exemplarily includes a maneuvering organ (control input) 1 arranged on a panel 14 in the cabin of the vehicle, the maneuvering organ (control input) being in the form of a button which is intended to be hand maneuvered by a driver of the vehicle. The word "panel" refers herein to an inner wall section of the cabin, more precisely to the instrument panel of the vehicle. The function of the maneuvering organ (control input) 1 is accomplished at least in part via a control unit 2 coupled to at least one of, and preferably all of, the brakes 3 of the vehicle, and to the gearbox 4 of the vehicle. When activating the maneuvering organ (control input) 1 (depressing the button), the brakes 3 are activated and the gearbox 4 is brought to its neutral position.

The brakes 3 are more precisely activated by means of a brake pressure determined in advance. Preferably, the pressure is activated successively until the predetermined brake pressure has been reached.

The gearbox is preferably automatic and connected to a converter. An engaged gear would bring about energy losses in the form of so-called "dragging" in a non-moving vehicle. This means that the neutral position should be obtained (selected) in the gearbox during dumping or loading respectively.

The maneuvering organ (control input) 1 is arranged in the immediate vicinity of the tilting lever 5 of the vehicle in such a way that the driver can maneuver the tilting lever 5 and the maneuvering organ (control input) 1 at the same time, and with the same hand. The tilting lever 5 is connected to the load-carrying platform of the vehicle via hydraulic circuits with the purpose of raising/lowering the platform. According to a preferred embodiment, the tilting lever 5 is arranged on the right side of the driver so that it may be maneuvered with the right hand. The maneuvering organ (control input) 1 is arranged to be maneuvered by the thumb of the driver while the driver still has the rest of his hand available for maneuvering the tilting lever 5. Since the maneuvering organ (control input) 1 is a button, its activation can take place quickly by means of depressing the button, and with a relatively small diversion of attention from controlling the rest of the vehicle and the load-carrying platform, which simplifies the dumping for the driver and contributes to an improved safety.

When dumping, the vehicle is backed up against an intended dumping position, and the platform is tilted, which allows the driver to see the ground behind the platform. When the vehicle has reached the intended dumping position, the driver eases up on the gas pedal and depresses the button 1. During dumping, the brakes 3 will now be activated automatically. After dumping and returning the platform to its initial position, the driver moves the gear lever 6 of the vehicle from its gear position to the neutral position, and then to the intended gear position. The device comprises an organ (element) 12 connected to the control unit 2 for detecting manual movement of the gear lever 6. The organ (element) 12 for detecting the gear lever can, for example, be a breaker. When the gear lever 6 reaches the neutral position, the operation of the maneuvering organ (control input) 1 is terminated as it relates to the positioning of the gearbox to the neutral position. When the gear lever has been brought to the intended gear position and the transmission thus is in a tractive position, the function of the maneuvering organ (control input) 1 is terminated with relationship to the activation of the brakes 3.

The device additionally includes an organ (indicator) 8 coupled to the control unit 2 for indicating that the maneuvering organ (control input) 1 is activated, and that the brake 3 thus is activated, and that the gearbox 4 is in its neutral position. The indication organ 8 is preferably a lamp arranged on the instrument panel. The lamp is lit when the maneuvering organ (control input) 1 is activated, and is shut-off when the brakes 3 are released.

The device additionally includes an organ (element) 9 coupled to the control unit 2 for detecting the speed of the vehicle, with the purpose of maintaining the brake 3 in a non-active position and the current gear of the gearbox 4, in spite of an activation of the maneuvering organ (control input) 1 when the speed of the vehicle exceeds a predetermined speed. This predetermined speed is preferably in the range of 0–7 km/h. The speed sensing organ (element) 9 can, for example, be a conventional speedometer.

The device also has an organ (sensor) 10 coupled to the control unit 2 for sensing the pressure in the brake 3. The control unit 2 is coupled to the parking brake 11 of the vehicle for activating it when the brake pressure falls below a predetermined value. In FIG. 1 a control device 13 is illustrated which is coupled to the parking brake 11 for manual control of the parking brake.

The control unit 2 is also coupled to the engine 7 of the vehicle. The control unit 2 is arranged to activate the parking brake 11 if the engine is turned off or if the engine is stalled with the brakes activated and the gearbox is in the neutral position.

The control unit 2 is preferably a computer unit including software for controlling the parts and functions of the device.

In an alternative to the above described position for the maneuvering organ (control input) 1, i.e. next to and in the immediate vicinity of the tilting lever, the maneuvering organ is arranged directly on the tilting lever. In yet another alternative, the maneuvering organ is arranged on the steering wheel of the vehicle.

The maneuvering organ (control input) 1 can, as an alternative to a button, be a lever or another control means.

Another equivalent to the above described embodiment is of course that the maneuvering organ (control input) 1 is arranged in a vehicle, with the instrument panel including, among other things, the tilting lever on the left side of the driver. The maneuvering organ (control input) 1 is also in this case preferably arranged on the left side of the driver in connection to the tilting lever.

What is claimed is:

1. A device for controlling a load-carrying vehicle when dumping or loading a load-carrying platform of the vehicle, the device installed in a load-carrying vehicle having a dumping load-carrying platform, said device comprising a maneuvering organ configured to be arranged in a cabin of the load-carrying vehicle for hand maneuvering by a driver, and a control unit operatively coupled to the maneuvering organ, to a brake of the load-carrying vehicle and to a gearbox of the load-carrying vehicle, so that the device, when the maneuvering organ is activated, activates the brake and institutes a neutral position in the gearbox and a sensor connected to the control unit for sensing the speed of the vehicle with the purpose of maintaining the brake in a non-active position and a present gear in the gearbox, despite an activation of the maneuvering organ when a speed of the vehicle exceeds a predetermined speed.

2. A device for controlling a load-carrying vehicle when dumping or loading a load-carrying platform of the vehicle, the device installed in a load-carrying vehicle having a dumping load-carrying platform, said device comprising a maneuvering organ configured to be arranged in a cabin of the load-carrying vehicle for hand maneuvering by a driver, a control unit operatively coupled to the maneuvering organ, to a brake of the load-carrying vehicle and to a gearbox of the load-carrying vehicle, so that the device, when the maneuvering organ is activated, activates the brake and institutes a neutral position in the gearbox and a sensor coupled to the control unit for sensing brake pressure, and wherein the control unit is coupled to a parking brake of the vehicle for its activation when brake pressure falls below a predetermined value.

3. The device according to claim 2, wherein the maneuvering organ is arranged in such a way that it is within the reach of the driver while the driver simultaneously is maneuvering a steering wheel and a dumping lever of the vehicle.

4. The device according to claim 2, wherein the maneuvering organ is arranged on a panel in the cabin, in the immediate vicinity of a dumping lever of the vehicle, in such a way that the maneuvering organ is within reach of the driver while simultaneously maneuvering the dumping lever with the same hand.

5. The device according to claim 2, further comprising a sensor connected to the control unit for sensing a manual movement of a gear shift lever connected to the gearbox.

6. The device according to claim 2, wherein the device is adapted for use in an articulated dumper.

7. A method for controlling a load-carrying vehicle when dumping or loading a load-carrying platform of the vehicle, the method comprising:

detecting maneuvering of a hand maneuvering organ arranged in a cabin of a load-carrying vehicle having a dumping load-carrying platform utilizing a control unit operatively coupled between the maneuvering organ, a brake of the vehicle and a gearbox of the vehicle, and activating, via the control unit, a brake of the vehicle and causing a gearbox of the load-carrying vehicle to assume a neutral position when maneuvering of the hand maneuvering organ is detected; and detecting manual movement of a gear selection lever connected to the gearbox from the neutral position to a gear position when the maneuvering organ is activated, and releasing the brake when the movement is detected.

8. The method according to claim 7, further comprising detecting pressure in the brake and activating a parking brake of the vehicle when brake pressure falls below a predetermined value.

9. The method according to claim 7, further comprising activating a parking brake of the vehicle when an engine of the vehicle is turned off or when the engine stalls if the brake has previously been activated and the gearbox has been brought to the neutral position via activation of the maneuvering organ.

10. A control device for a load-carrying vehicle with a plurality of brakes and a gearbox having a neutral position, the device comprising:

a control unit, installed in a load-carrying vehicle having a dumping load-carrying platform, coupled to a brake and a gearbox of the vehicle;

a maneuvering control for operation by a driver, the maneuvering control in signal communication with the control unit, the maneuvering control generating a signal for activating the brake and for selecting the neutral position of the gearbox when the maneuvering control is activated and wherein the control unit receives a signal indicative of speed of the vehicle and wherein the control unit does not activate the brake if the indicated vehicle speed exceeds a predetermined level.

11. The device according to claim 10, wherein the maneuvering control is arranged adjacent to a dumping lever of the vehicle.

12. The device according to claim 10, further comprising a sensor in signal communication with the control unit for sensing movement of the gearbox from the neutral position.

13. The device according to claim 10, wherein the control unit receives a signal indicative of pressure in the brake, and wherein the control unit is coupled to a parking brake of the vehicle for activation when the brake pressure falls below a predetermined value.

14. A control device for a load-carrying vehicle with a plurality of brakes and a gearbox having a neutral position, the device comprising:
   a control unit, installed in a load-carrying vehicle having a dumping load-carrying platform, coupled to a brake and a gearbox of the vehicle; and
   a maneuvering control for operation by a driver, the maneuvering control in signal communication with the control unit, the maneuvering control generating a signal for activating the brake and for selecting the neutral position of the gearbox when the maneuvering control is activated terminating the first signal for activating the brake if the gearbox is moved from the neutral position while the maneuvering control is activated.

15. A method for controlling a load-carrying vehicle when dumping or loading a load carrying platform of the vehicle, said method comprising:
   detecting maneuvering of a control input arranged in a cabin of a load-carrying vehicle having a load-carrying platform using a computer control unit operatively coupled between the control input, a parking brake of the vehicle and a gearbox of the vehicle;
   activating a parking brake of the vehicle using the computer control unit; and
   causing a gearbox of the load-carrying vehicle to assume a neutral position using the computer control unit.

16. The method as recited in claim 15, wherein the control input is arranged in such a way that it is within the reach of a driver of the vehicle when the driver is maneuvering a steering wheel and a dumping lever of the vehicle.

17. The method as recited in claim 15, wherein the control input is arranged in such a way that it is within the reach of a driver of the vehicle when the driver is maneuvering a dumping lever with the same hand.

18. The method as recited in claim 15, further comprising utilizing a sensor connected to the computer control unit for sensing manual maneuvering of a gear shift lever connected to the gearbox of the vehicle.

19. The method as recited in claim 15, further comprising utilizing a sensor connected to the computer control unit for sensing a speed of the vehicle and maintaining the parking brake in a non-active position and a present gear in the gearbox when the speed of the vehicle exceeds a predetermined speed.

20. The method as recited in claim 15, wherein the vehicle is an articulated dumper.

21. The method as recited in claim 15, further comprising detecting manual movement of a gear selection lever using the computer control unit and releasing the parking brake in response thereto using the computer control unit.

* * * * *